(12) United States Patent
Hamada et al.

(10) Patent No.: US 11,371,534 B2
(45) Date of Patent: Jun. 28, 2022

(54) COMPRESSOR AND METHOD OF OPERATING SAME

(71) Applicant: KOBELCO COMPRESSORS CORPORATION, Tokyo (JP)

(72) Inventors: Katsunori Hamada, Hyogo (JP); Shuto Yakubo, Hyogo (JP); Akira Hoshikawa, Hyogo (JP)

(73) Assignee: KOBELCO COMPRESSORS CORPORATION, Tokyo (JP)

(*) Notice: Subject to any disclaimer, the term of this patent is extended or adjusted under 35 U.S.C. 154(b) by 0 days.

(21) Appl. No.: 17/259,858

(22) PCT Filed: Jul. 3, 2019

(86) PCT No.: PCT/JP2019/026510
§ 371 (c)(1),
(2) Date: Jan. 12, 2021

(87) PCT Pub. No.: WO2020/026688
PCT Pub. Date: Feb. 6, 2020

(65) Prior Publication Data
US 2021/0222706 A1     Jul. 22, 2021

(30) Foreign Application Priority Data

Jul. 31, 2018 (JP) .............................. JP2018-144130

(51) Int. Cl.
*F04D 27/00* (2006.01)
*F04D 29/70* (2006.01)
(Continued)

(52) U.S. Cl.
CPC ......... *F04D 29/706* (2013.01); *B01D 53/265* (2013.01); *F04D 27/001* (2013.01); *F04D 27/004* (2013.01); *F04D 27/0215* (2013.01)

(58) Field of Classification Search
CPC ................ F04D 27/004; F04D 29/706; F05D 2260/602; F05D 2260/609; F05D 2270/301
See application file for complete search history.

(56) References Cited

FOREIGN PATENT DOCUMENTS

| DE | 10047940 A1 * 12/2001 .............. F04C 18/16 |
| JP | H09-144664 A 6/1997 |

(Continued)

OTHER PUBLICATIONS

Notification of Transmittal of Translation of the International Preliminary Report on Patentability and Translation of Written Opinion of the International Searching Authority; PCT/JP2019/026510; dated Feb. 11, 2021.

*Primary Examiner* — Ninh H. Nguyen
(74) *Attorney, Agent, or Firm* — Studebaker & Brackett PC (57) ABSTRACT

Provided is a compressor including: a compressor body that has a motor and compresses air; an aftercooler for cooling the compressed air supplied from the compressor body; a dryer for dehumidifying the compressed air flowing out from the aftercooler; a drain discharge valve for discharging a drain from the dryer; a first pressure sensor for measuring air pressure downstream of the aftercooler; and a control device having a rotation-speed adjusting unit that drives the motor at second acceleration smaller than first acceleration, the first acceleration being rated acceleration of the motor, when a pressure value measured by the first pressure sensor is less than a first threshold value predetermined at startup of the motor.

10 Claims, 4 Drawing Sheets

(51) Int. Cl.
*B01D 53/26* (2006.01)
*F04D 27/02* (2006.01)

(56) References Cited

FOREIGN PATENT DOCUMENTS

| | | | |
|---|---|---|---|
| JP | 2002-242843 A | | 8/2002 |
| JP | 2009-180134 A | | 8/2009 |
| JP | 5675568 B2 | * | 2/2015 |
| JP | 2015-105648 A | | 6/2015 |
| JP | 2016211584 A | * | 12/2016 |
| JP | 2018-025166 A | | 2/2018 |
| WO | WO-2009122784 A1 | * | 10/2009 .............. F04C 28/06 |

* cited by examiner

COMPRESSOR AND METHOD OF OPERATING SAME

CROSS-REFERENCE TO RELATED APPLICATIONS

This is a national phase application in the United States of International Patent Application No. PCT/JP2019/026510 with an international filing date of Jul. 3, 2019, which claims priority of Japanese Patent Application No. 2018-144130 filed on Jul. 31, 2018 the contents of which are incorporated herein by reference.

TECHNICAL FIELD

The present invention relates to a compressor and a method of operating the compressor.

BACKGROUND ART

A compressor generally includes a cooler called an aftercooler for cooling compressed gas heated by heat of compression, and a dryer for removing water from the compressed gas. The aftercooler and the dryer may functionally retain water inside. This water is called a drain, and the drain is prevented from being supplied to a supply destination (such as a factory) of the compressed gas by discharging the drain regularly, for example. For example, jp 2002-242843 A discloses a compressor having a function of discharging such a drain.

SUMMARY OF THE INVENTION

The compressor of JP 2002-242843 A is configured such that an electric motor and a compressor body are stopped and an on-off valve is closed when dry gas discharged from a gas discharge path increases in pressure to upper-limit set pressure, and when the dry gas decreases in pressure to lower-limit set pressure, the electric motor and the compressor body are driven and the on-off valve is opened intermittently. This allows slowing down a rate of decrease in pressure of the gas supplied from the gas discharge path to the supply destination even after the drive of the compressor body is stopped. However, only opening the on-off valve intermittently may cause the drain to be erroneously supplied to the supply destination together with the compressed gas. Hereinafter, leakage of the drain to the supply destination in this way is also referred to as carryover.

The carryover often occurs when the compressor is started. That is, the carryover often occurs during a period shifting to normal operation after a main motor is turned on (started), or at startup of the main motor. Experiments performed by the applicant show that the carryover was often observed when a flow path connected to the dryer was under low pressure after the main motor was started. When the flow path connected to the dryer is under low pressure as described above, a pressure difference between outlet pressure of the compressor body and package discharge pressure (hereinafter, simply referred to as discharge pressure) corresponding to pressure in piping to the supply destination increases, and thus flow velocity of the compressed gas passing through the dryer increases. Thus, it is considered that the drain is carried to the supply destination on this fast flow and the carryover occurs. When the carryover occurs, the piping to the supply destination is rusted. This causes various adverse effects such as that when a power machine such as a turbine is driven by using compressed gas at a supply destination, a load on the turbine increases. Thus, it is required to prevent such carryover.

An object of the present invention is to provide a compressor capable of preventing carryover of a drain at startup and a method of operating the compressor.

A first aspect of the present invention provides a compressor including: a compressor body driven by a motor to compress gas; an aftercooler for cooling the compressed gas supplied from the compressor body; a dryer for dehumidifying the compressed gas flowing out from the aftercooler; a drain discharge valve for discharging a drain from the dryer; a first pressure sensor for measuring gas pressure downstream of the aftercooler; and a rotation-speed adjusting unit that drives the motor at second acceleration smaller than first acceleration, the first acceleration being rated acceleration of the motor, when a pressure value measured by the first pressure sensor is less than a first threshold value predetermined at startup of the motor.

According to this configuration, the rotation-speed adjusting unit accelerates the motor at the second acceleration when the pressure value measured by the first pressure sensor is less than the first threshold value predetermined. Here, the first threshold value is a lower pressure value that carryover occurs. Accelerating the motor at the second acceleration causes a flow rate per unit time of compressed gas discharged from the compressor body to decrease to less than a flow rate when the compressed gas is discharged in accordance with rated acceleration of the motor as in a conventional case. This enables gas passing through the dryer to be brought into a state where the gas has flow velocity reduced to a speed that does not cause carryover until discharge pressure increases to pressure that does not cause carryover. As a result, carryover of a drain at startup of the compressor can be prevented.

A second aspect of the present invention provides a compressor including: a compressor body driven by a motor to compress gas; a separator tank for separating a coolant from the compressed gas supplied from the compressor body and stores the coolant; a pressure-holding check valve for preventing the compressed gas from flowing back toward the separator tank to keep pressure in the separator tank equal to or more than a second threshold value predetermined; a dryer provided downstream of the pressure-holding check valve to dehumidify the compressed gas supplied; a drain discharge valve for discharging a drain from the dryer; a first pressure sensor for measuring gas pressure downstream of the pressure-holding check valve; and a control device including a rotation-speed adjusting unit that drives the motor at second acceleration smaller than first acceleration, the first acceleration being rated acceleration of the motor, when a pressure value measured by the first pressure sensor is less than a first threshold value predetermined at startup of the motor.

According to this configuration, carryover of a drain at startup of the compressor can be prevented as in the first aspect.

A second pressure sensor for measuring the pressure in the separator tank may be further provided, and the control device may further include a drain-discharge-valve control unit that opens the drain discharge valve when a pressure value measured by the second pressure sensor is equal to or more than the second threshold value at startup of the motor.

According to this configuration, when a pressure value measured by the second pressure sensor is equal to or more than the second threshold value, the drain-discharge-valve control unit opens the drain discharge valve. Here, the second threshold value is a set value of the pressure-holding check valve, and can be set within a predetermined range according to specifications and the like of each component of the compressor. If the drain discharge valve is opened at a pressure value measured by the second pressure sensor that is less than the second threshold value, gas pressure in the dryer may decrease as a drain is discharged. Thus, it takes time to increase discharge pressure of the compressor to gas pressure required by the supply destination. Then, when the drain discharge valve is opened at a pressure value measured by the second pressure sensor that is equal to or more than the second threshold value, increase in time required to increase the discharge pressure to the required pressure can be prevented. According to this configuration, a drain can be discharged from the drain discharge valve while carryover of the drain is prevented at startup of the compressor.

A third aspect of the present invention provides a compressor including: a compressor body driven by a motor to compress gas; an aftercooler for cooling the compressed gas supplied from the compressor body; a dryer for dehumidifying the compressed gas flowing out from the aftercooler; a drain discharge valve for discharging a drain from the dryer; a first pressure sensor for measuring gas pressure downstream of the aftercooler; a separator tank for separating a coolant from gas flowing from the compressor body to the aftercooler and stores the coolant; a second pressure sensor for measuring pressure in the separator tank; a pressure-holding check valve for preventing the compressed gas from flowing back toward the separator tank to keep the pressure in the separator tank equal to or more than a second threshold value predetermined; and a control device including a rotation-speed adjusting unit that drives the motor at second acceleration smaller than first acceleration, the first acceleration being rated acceleration of the motor, when a pressure value measured by the first pressure sensor is less than a first threshold value predetermined and a pressure value measured by the second pressure sensor is equal to or more than the second threshold value, at startup of the motor, and a drain-discharge-valve control unit that opens the drain discharge valve when the pressure value measured by the second pressure sensor is equal to or more than the second threshold value at the startup.

According to this configuration, the rotation-speed adjusting unit causes the motor to be accelerated at the second acceleration when the pressure value measured by the first pressure sensor is less than the first threshold value predetermined, and the drain-discharge-valve control unit opens the drain discharge valve when the pressure value measured by the second pressure sensor is equal to or more than the second threshold value. Here, the second threshold value is a set value of the pressure-holding check valve, and can be set within a predetermined range according to specifications and the like of each component of the compressor. If the drain discharge valve is opened at a pressure value measured by the second pressure sensor that is less than the second threshold value, gas pressure in the dryer may decrease as a drain is discharged. Thus, it takes time to increase discharge pressure of the compressor to gas pressure required by the supply destination. Then, when the drain discharge valve is opened at a pressure value measured by the second pressure sensor that is equal to or more than the second threshold value, increase in time required to increase the discharge pressure to the required pressure can be prevented. Additionally, a drain can be discharged from the drain discharge valve while carryover of the drain is prevented at startup of the compressor.

The rotation-speed adjusting unit may change acceleration of the motor from the second acceleration to the first acceleration when the pressure value measured by the first pressure sensor is equal to or more than the first threshold value, or when a predetermined time elapses after changing acceleration from the first acceleration to the second acceleration. The drain-discharge-valve control unit may close the drain discharge valve after the acceleration is changed from the second acceleration to the first acceleration, or when a predetermined time elapses after the drain discharge valve is, opened, whichever is earlier.

According to this configuration, an excessive pressure decrease can be prevented by preventing an excessive leakage of the compressed gas that may occur by continuing to open the drain discharge valve. The predetermined time here is time required to discharge a drain from the discharge valve during operation after changing to the second acceleration. This predetermined time can be experimentally determined in advance. When the acceleration of the motor is changed to the first acceleration, pressure increases or a drain has already been discharged to the extent that carryover does not occur. Thus, carryover can be prevented even when the motor is driven at the first acceleration, and rotation speed of the motor can be accelerated in a shorter time than as compared to a case where the motor is driven at the second acceleration. Here, the term, after acceleration is changed from the second acceleration to the first acceleration, includes the time at which the acceleration is changed from the second acceleration to the first acceleration.

The rotation-speed adjusting unit may accelerate the motor to rated rotation speed after change to the first acceleration.

According to this configuration, the motor can be quickly accelerated to the rated rotation speed at the first acceleration, so that the motor can be shifted to the normal operation from the time of startup.

A fourth aspect of the present invention provides a method of operating a compressor including: a compressor body driven by a motor to compress gas; an aftercooler for cooling the compressed gas supplied from the compressor body; a dryer for dehumidifying the compressed gas flowing out from the aftercooler; a drain discharge valve for discharging a drain from the dryer; and a first pressure sensor for measuring pressure of gas supplied to the dryer from the aftercooler, wherein the method further includes driving the motor at second acceleration smaller than first acceleration, the first acceleration being rated acceleration of the motor, when a pressure value measured by the first pressure sensor is less than a first threshold value predetermined at startup of the compressor body.

A fifth aspect of the present invention provides a method of operating a compressor including: a compressor body driven by a motor to compress gas; a separator tank for separating a coolant from the compressed gas supplied from the compressor body and stores the coolant; a pressure-holding check valve for preventing the compressed gas from flowing back toward the separator tank to keep pressure in the separator tank at a second threshold value or more; a dryer provided downstream of the pressure-holding check valve to dehumidify the compressed gas supplied; a drain discharge valve for discharging a drain from the dryer; a first pressure sensor for measuring gas pressure downstream of the pressure-holding check valve; and a second pressure sensor for measuring the pressure in the separator tank, wherein the method further includes driving the motor at second acceleration smaller than first acceleration, the first acceleration being rated acceleration of the motor, when a pressure value measured by the first pressure sensor is less than a first threshold value predetermined at startup of the motor.

The drain discharge valve may be opened when the pressure value measured by the second pressure sensor is equal to or more than the second threshold value.

According to the present invention, the compressor and the method of operating the compressor enable preventing carryover of a drain at startup by suitably controlling the acceleration of the rotation speed of the motor and the opening and closing of the drain discharge valve.

MODE FOR CARRYING OUT THE INVENTION

Embodiments of the present invention will be described below with reference to the accompanying drawings.

Embodiments of the present invention will be described below with reference to the accompanying drawings.

Figure 1:
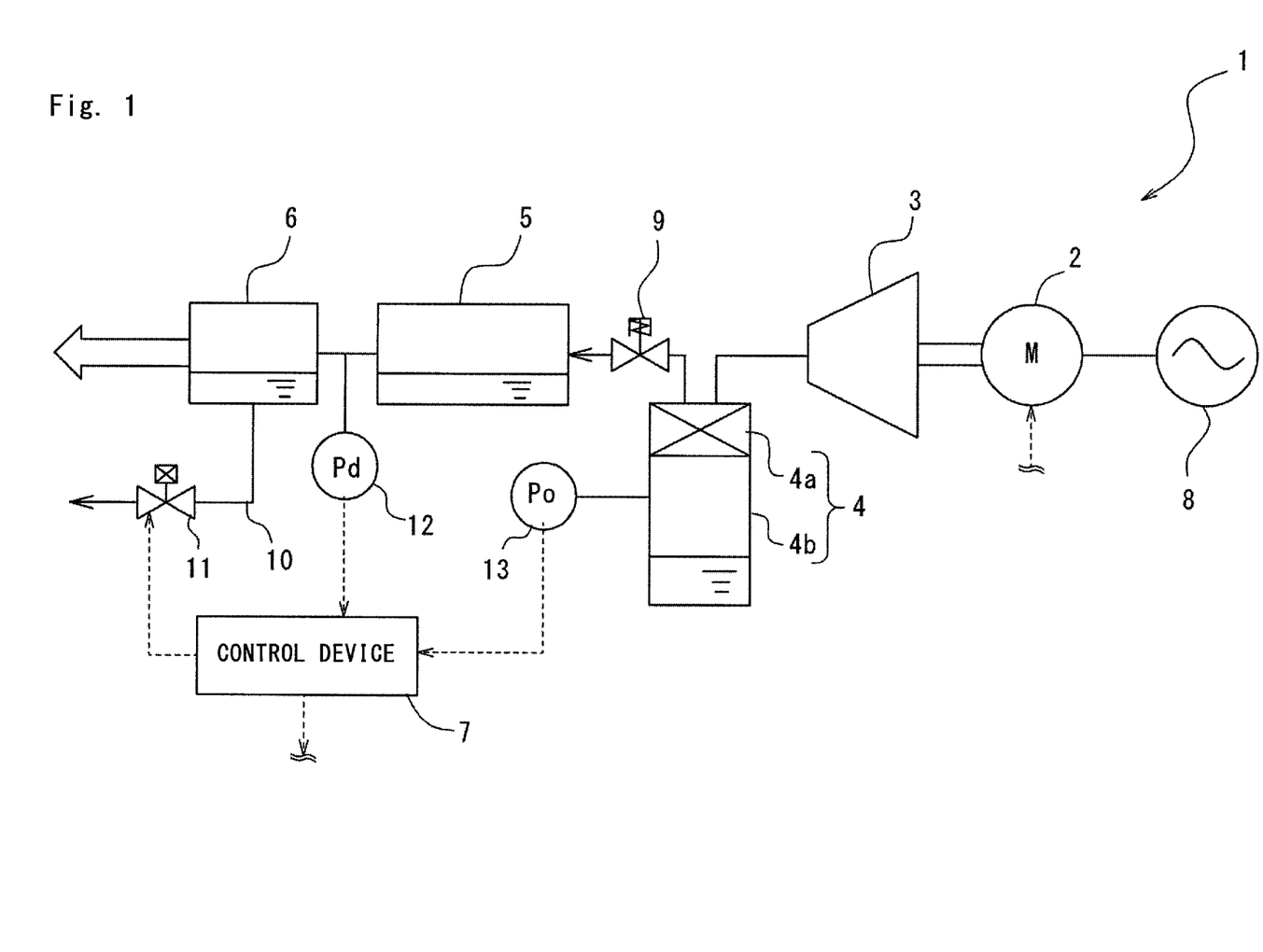
FIG. 1 is a schematic configuration diagram of a compressor according to an embodiment of the present invention.

FIG. 1 is a schematic configuration diagram illustrating a compressor 1 of a package type according to an embodiment. The package type means that various components such as a dryer 6 are included in addition to a compressor body 3 described later. Although the present embodiment describes air as gas to be compressed and oil as a coolant, as an example, a type of gas may be other than air, and a type of coolant may be water.

The compressor 1 includes the compressor body 3 having a motor 2, a separator tank 4 that separates and recovers oil as a coolant from compressed air, an aftercooler 5 that cools the compressed air, a dryer 6 that dehumidifies the compressed air, and a control device 7.

The compressor body 3 is a screw type and has a pair of male and female screw rotors. The screw rotor is mechanically connected to the motor 2, and the motor 2 is electrically connected to a power supply 8. The pair of male and female screw rotors mesh with each other by being rotationally driven by the motor 2 supplied with power from the power supply 8, and compress air. The screw rotors are supplied with oil from the viewpoint of cooling, sealing, and the like. Here, some of the supplied oil is used for cooling, sealing, and the like of the screw rotors and the like, and then discharged together with the compressed air from an exhaust port of the compressor body 3. The compressor body 3 is fluidly connected to the separator tank 4, and the compressed air containing the oil, being compressed by the compressor body 3, is pumped to the separator tank 4.

The separator tank 4 has a liquid separator 4a and a liquid tank 4b. The liquid separator 4a is a filter that separates liquid (oil) from compressed air. The oil separated from the compressed air by the liquid separator 4a is collected in the liquid tank 4b. The separator tank 4 is fluidly connected to the aftercooler 5 using a pressure-holding check valve 9, and the compressed air from which the oil is separated in the separator tank 4 is fed to the aftercooler 5.

The pressure-holding check valve 9 has a function of keeping pressure of the compressed air in the separator tank equal to or more than a second threshold value predetermined and preventing a backflow of the compressed air discharged from the separator tank 4 to the separator tank 4. Thus, air does not return from the aftercooler 5 to the separator tank 4. Here, the second threshold value is a set value of the pressure-holding check valve 9, and can be set within a predetermined range according to specifications and the like of each component of the compressor 1. In the present embodiment, the second threshold value is set to, for example, about 0.45 to 0.5 MPa.

The aftercooler 5 is a heat exchanger that cools compressed air using a refrigerant. A type of the refrigerant is not particularly limited, and the aftercooler 5 may be a water-cooled type, an air-cooled type, or the like. Alternatively, the aftercooler 5 may be an electrical cooling device. Here, the cooled compressed air is partially condensed, and the condensed water (drain) is collected in the aftercooler 5. The aftercooler 5 is fluidly connected to the dryer 6, and the compressed air cooled by the aftercooler 5 is fed to the dryer 6. When water is used as the coolant, the aftercooler 5 can be eliminated. In this case, the separator tank 4 and the dryer 6 are fluidly connected.

The dryer 6 can be a so-called freezing dryer. That is, a refrigerant is used to condense water in compressed air, and the water is removed from the compressed air. The dryer 6 has a storage portion so that condensed water (drain) can be temporarily collected in the dryer 6. The dryer 6 has a mechanism as a refrigerator, being not different from a publicly known mechanism, so that detailed description here will be eliminated. The dryer 6 is fluidly connected to a supply destination (not illustrated) of compressed air, such as a factory, and the compressed air dehumidified by the dryer 6 is fed to the supply destination.

The dryer 6 is provided with a drain pipe 10 for discharging a drain and a drain discharge valve 11 for allowing or blocking a flow of the drain in the drain pipe 10. The drain discharge valve 11 is composed of a solenoid valve, and opening and closing of the drain discharge valve 11 is controlled by the control device 7.

For control by the control device 7, a first pressure sensor 12 and a second pressure sensor 13 are provided.

The first pressure sensor 12 is disposed between the aftercooler 5 and the dryer 6 in a flow of compressed air, and measures a pressure value Pd of the compressed air in this portion. However, the pressure measurement position of the first pressure sensor 12 is not limited to this position, and may be any position downstream of the pressure-holding check valve 9. For example, a pressure value at a position downstream of the dryer 6 may be detected.

The second pressure sensor 13 is attached to the liquid tank 4b and detects a pressure value Po in the liquid tank 4b. That is, the second pressure sensor 13 detects a pressure value downstream of the compressor body 3 and upstream of the pressure-holding check valve 9.

The control device 7 is composed of hardware including storage devices such as a central processing unit (CPU), a random access memory (RAM), a read only memory (ROM), and a programmable logic controller (PLC), and software implemented therein. The control device 7 receives the pressure value Pd measured by the first pressure sensor 12 and the pressure value Po measured by the second pressure sensor 13, and controls the compressor 1 based on the pressure values Pd and Po.

Figure 2:
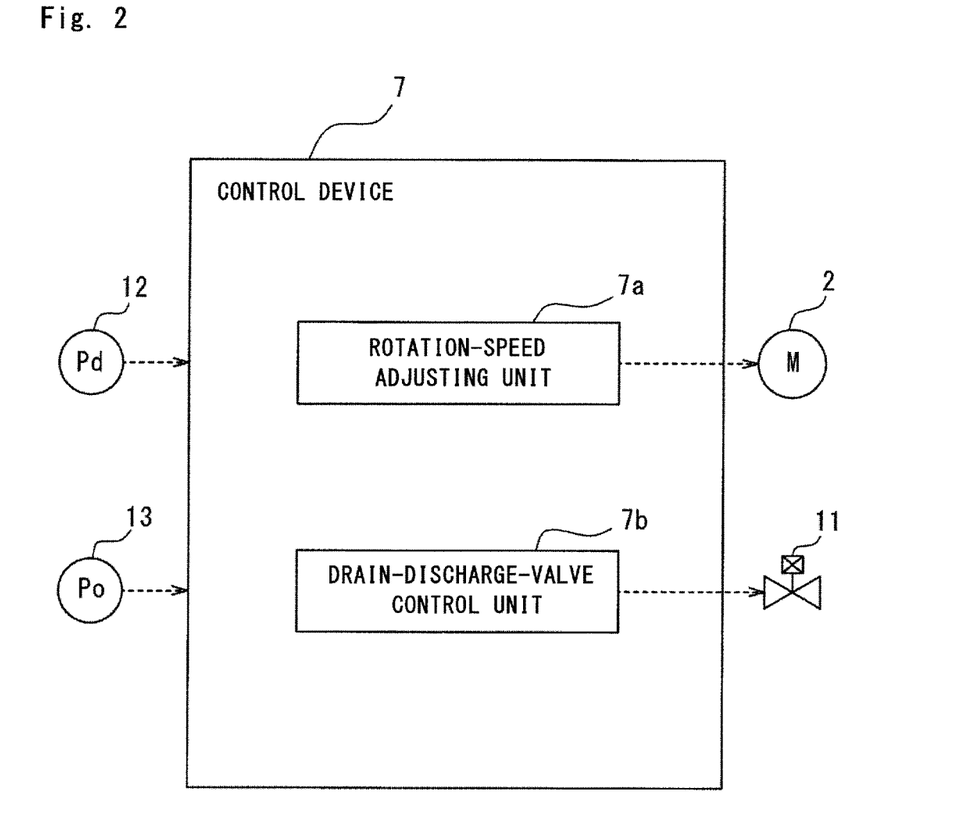
FIG. 2 is a block diagram of a control device.

FIG. 2 is a block diagram of the control device 7. The control device 7 has a rotation-speed adjusting unit 7*a* and a drain-discharge-valve control unit 7*b*.

The rotation-speed adjusting unit 7*a* causes the motor 2 to be driven at second acceleration (a2) smaller than first acceleration (a1) being the rated acceleration of the motor 2 when the pressure value Pd measured by the first pressure sensor 12 is less than a first threshold value predetermined at startup of the motor 2 that drives the compressor body 3. In other words, at startup of the motor, the rotation-speed adjusting unit 7*a* accelerates rotation speed of the motor 2 in at least two steps. Here, the first threshold value is a lower pressure value that carryover occurs. In the present embodiment, the first threshold value is set to, for example, about 0.3 MPa. The second acceleration (a2) is an acceleration that does not cause carryover even when there is a pressure difference between outlet pressure of the compressor body 3 and package discharge pressure (hereinafter, simply referred to as discharge pressure) corresponding to pressure in piping to the supply destination, at startup of the motor 2. This second acceleration (a2) can be experimentally determined in advance. When the second acceleration (a2) is experimentally determined, a maximum amount of drain may be preliminarily stored in the dryer 6 or the aftercooler 5. Then, when a pressure value measured by the second pressure sensor 13 is equal to or more than the second threshold value, the drain discharge valve 11 may be opened.

The rotation-speed adjusting unit 7*a* of the present embodiment changes acceleration from the second acceleration to the first acceleration after a predetermined time ΔT1 elapses after driving the motor 2 at the second acceleration, and causes the motor 2 to accelerate to the rated rotation speed. The predetermined time ΔT1 here is time required to discharge a drain from the discharge valve when the motor 2 is operated at the second acceleration. This predetermined time ΔT1 can be experimentally determined in advance. For example, this predetermined time ΔT1 may be set to time sufficient to discharge a maximum amount of drain that can be stored in the dryer 6 and the aftercooler 5.

Alternatively, the amount of drain stored may be calculated from an operating state of the compressor 1 and the time may be set so that the amount of drain can be accurately discharged.

Figure 3:
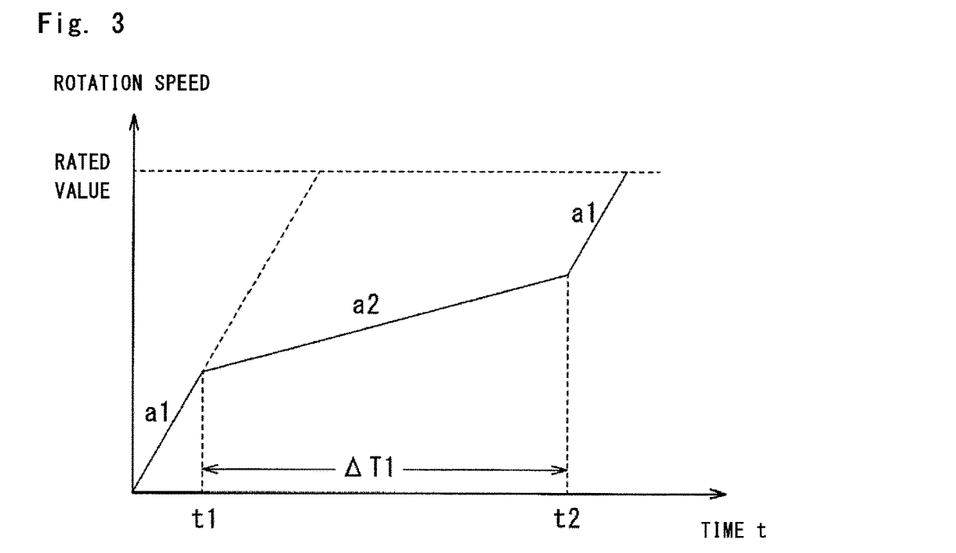
FIG. 3 is a graph showing a relationship between rotation speed of a motor and time at startup.

FIG. 3 is a graph showing a relationship between rotation speed of the motor 2 and time t at startup. The graph has the horizontal axis representing the time t, and the vertical axis representing the rotation speed of the motor 2. Thus, a slope on the graph indicates acceleration of the rotation speed of the motor 2.

In the present embodiment, the motor 2 is driven at the first acceleration (rated acceleration) a1 at startup. Next, when it is detected that the pressure value Pd measured by the first pressure sensor 12 is less than the first threshold value predetermined, the rotation-speed adjusting unit 7*a* causes acceleration of the rotation speed of the motor 2 to be reduced to the second acceleration a2 from the first acceleration a1. That is, the slope on the graph becomes gentle at time t1. Then, after the predetermined time ΔT1 elapses, the rotation-speed adjusting unit 7*a* increases the acceleration of the rotation speed of the motor 2 from the second acceleration a2 to the first acceleration a1. That is, the slope on the graph becomes steep at time t2. Then, the motor 2 is accelerated to the rated rotation speed at the first acceleration a1.

The drain-discharge-valve control unit 7*b* opens the drain discharge valve 11 when the pressure value Po measured by the second pressure sensor 13 is equal to or more than the second threshold value predetermined. The drain-discharge-valve control unit 7*b* preferably opens the drain discharge valve 11 when the pressure value Pd measured by the first pressure sensor 12 is less than the first threshold value and the pressure value Po measured by the second pressure sensor 13 is equal to or more than the second threshold value, as in the present embodiment. The drain-discharge-valve control unit 7*b* closes the drain discharge valve 11 is closed when the pressure value Pd measured by the first pressure sensor 12 is equal to or more than the first threshold value predetermined (i.e., after acceleration is changed from the second acceleration a2 to the first acceleration a1), or when predetermined time ΔT2 elapses after the drain discharge valve is opened. The predetermined time ΔT2 here is time required to discharge a drain from the discharge valve when the motor 2 is operated at the second acceleration. Here, the predetermined time ΔT2 can be experimentally determined in advance in the same manner as the above-mentioned predetermined time ΔT1. The predetermined time ΔT2 may be set longer than the above-mentioned predetermined time ΔT1 so that the drain discharge valve 11 is closed after the acceleration is changed from the second acceleration a2 to the first acceleration a1. The term, after the acceleration is changed from the second acceleration a2 to the first acceleration a1, includes the time at which the acceleration is changed from the second acceleration to the first acceleration.

Figure 4:
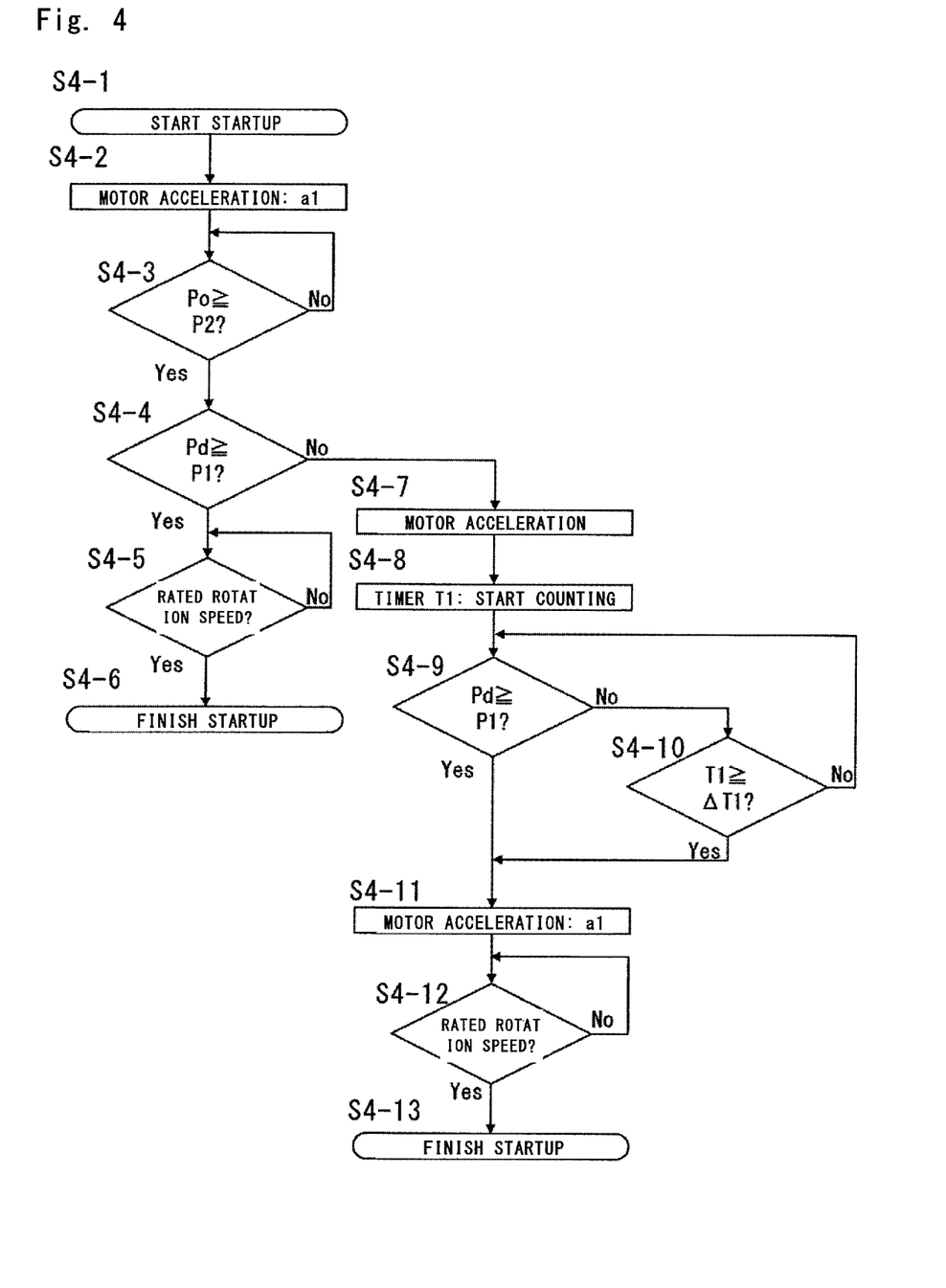
FIG. 4 is a flowchart illustrating acceleration control of a motor.
Figure 5:
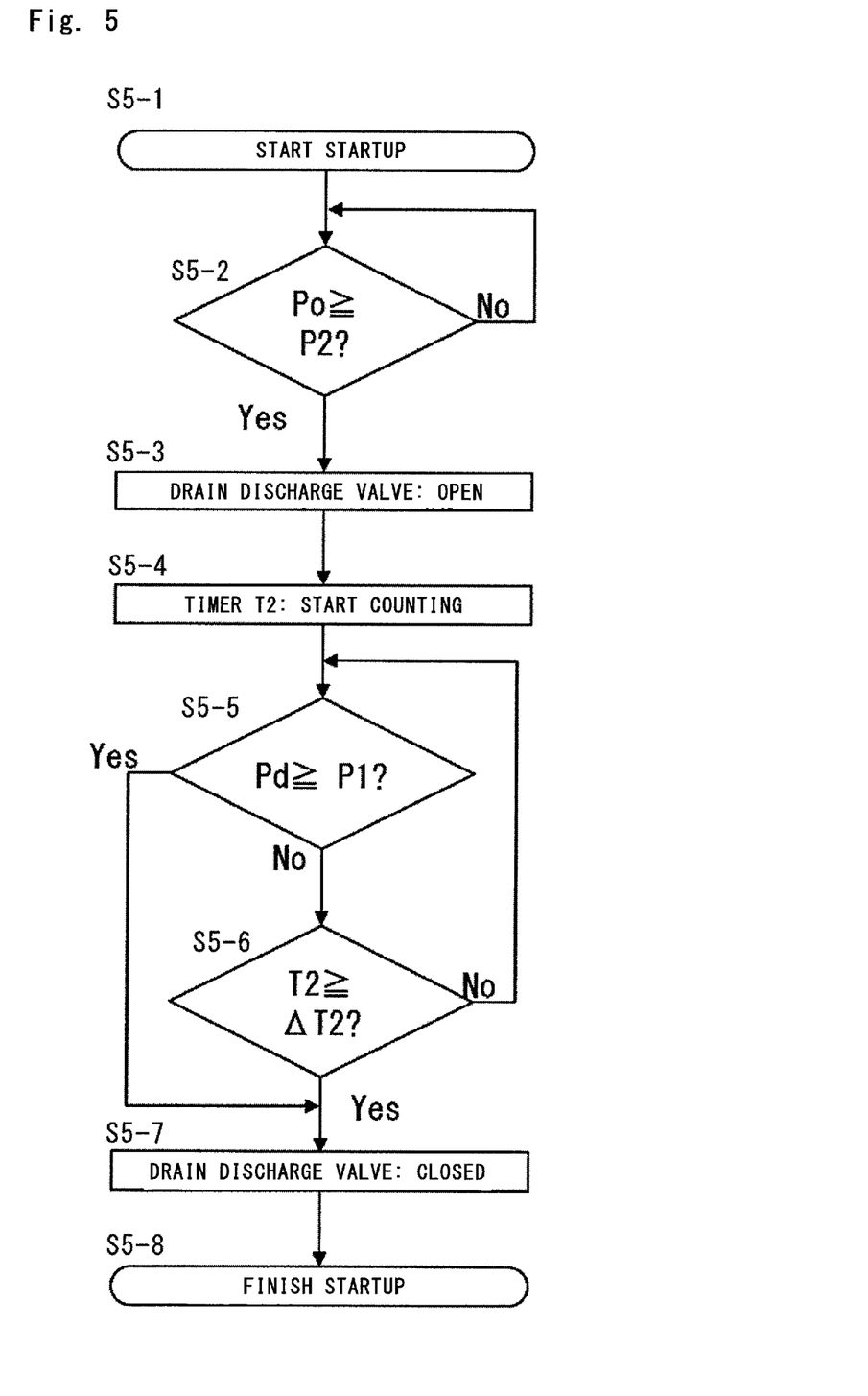
FIG. 5 is a flowchart illustrating opening and closing control of a drain discharge valve.

FIGS. 4 and 5 are flowcharts respectively illustrating control of acceleration of the motor 2 by the control device of the present embodiment and control of opening and closing the drain discharge valve 11 thereby.

First, the control of acceleration of the motor 2 will be described with reference to FIG. 4. When startup of the compressor body 3 is started, or startup of a motor is started by starting the motor 2 (step S4-1), acceleration of the motor 2 is set to the first acceleration (rated acceleration) a1 (step S4-2). Then, it is determined whether the pressure value Po is equal to or more than the second threshold value P2 (step S4-3). When the pressure value Po is less than the second threshold value P2, the acceleration is held until the pressure value Po becomes the second threshold value P2 or more (step S4-3). When the pressure value Po is equal to or more than the second threshold value P2, it is further determined whether the pressure value Pd is equal to or more than the first threshold value P1 (step S4-4).

When the pressure value Pd is equal to or more than the first threshold value P1, it is further determined whether rotation speed of the motor 2 has reached the rated rotation speed (step S4-5). When the rotation speed of the motor 2 has not reached the rated rotation speed, the acceleration is held until the rated rotation speed reaches the rated rotation speed. Then, the startup is finished (step S4-6), and the motor 2 shifts to normal operation.

When the pressure value Pd is less than the first threshold value P1 in step S4-4, the acceleration of the motor 2 is set to the second acceleration a2 (step S4-7). Then, a timer T1 starts counting (step S4-8). Next, it is determined again whether the pressure value Pd is equal to or more than the first threshold value P1 (step S4-9). When the pressure value Pd becomes equal to or more than the first threshold value P1, or after the predetermined time ΔT1 the timer T1 elapses (step S4-10), the acceleration of the motor 2 is set to the first acceleration a1 (step S4-11). Then, it is determined whether the rotation speed of the motor 2 has reached the rated rotation speed (step S4-12). When the rotation speed of the motor 2 has not reached the rated rotation speed, the acceleration is held until the rated rotation speed reaches the rated rotation speed. Then, the startup is finished (step S4-13), and the motor 2 shifts to the normal operation in which the compressor is operated by the motor 2 at the rated rotation speed.

Next, control of the drain discharge valve 11 will be described with reference to FIG. 5. When the startup of the compressor body 3 is started, or the startup of a motor is started by starting the motor 2 (step S5-1), it is determined whether the pressure value Po is equal to or more than the second threshold value P2 (step S5-2). When the pressure value Po is less than the second threshold value P2, the acceleration is held until the pressure value Po reaches the second threshold value P2, and when the pressure value Po is the second threshold value P2, the drain discharge valve 11 is opened (step S5-3). Then, a timer T2 starts counting (step S5-4). Next, it is determined whether the pressure value Pd measured by the first pressure sensor 12 is equal to or more than the predetermined first threshold value P1 (step S5-5). When the pressure value Pd measured by the first pressure sensor 12 is less than the predetermined first threshold value P1, the drain discharge valve 11 is closed (step S5-7) after the predetermined time ΔT2 elapses in the timer T2 (step S5-6). When the pressure value Pd measured by the first pressure sensor 12 is equal to or more than the predetermined first threshold value P1 from the beginning in step S5-5, or when the pressure value Pd measured by the first pressure sensor 12 becomes equal to or more than the predetermined first threshold value P1 before the predetermined time ΔT2 elapses in the timer T2, the drain discharge valve 11 is also closed (step S5-7). Specifically, when the pressure value Pd measured by the first pressure sensor 12 is equal to or more than the predetermined first threshold value P1 (steps S4-9 and S5-5), the drain discharge valve 11 is closed (step S5-7) after the acceleration of the motor 2 is changed from the second acceleration a2 to the first acceleration a1 (step S4-11), or when the predetermined time ΔT2 elapses in the timer T2 (step S5-6), whichever is earlier. After that, the startup is finished (step S5-8), and the motor 2 shifts to the normal operation. Here, the predetermined time ΔT2 is longer than the predetermined time ΔT1 described above. As a result, the drain discharge valve 11 is closed after the acceleration of the motor 2 is changed from the second acceleration a2 to the first acceleration a1 as described above.

The compressor 1 of the present embodiment and the method of operating the compressor 1 have the following advantages.

In the present embodiment, the rotation-speed adjusting unit 7a accelerates the motor 2 at the second acceleration a2 when the pressure value Pd measured by the first pressure sensor 12 is less than the first threshold value P1 predetermined. This enables preventing carryover by reducing a rate of increasing pressure of air discharged from the dryer 6, as compared to a case where pressure is increased at a rated acceleration a1 as in a conventional case, to suppress flow velocity of gas passing through the dryer 6 until discharge pressure is increased to pressure that does not cause the carryover (i.e., to pressure under which the flow velocity of the gas passing through the dryer does not cause the carryover even during the normal operation of the motor 2 at the rated rotation speed).

In the present embodiment, when the pressure value Po measured by the second pressure sensor 13 is equal to or more than the second threshold value P2, the drain discharge valve 11 is opened. If the drain discharge valve 11 is opened at the pressure value Po measured by the second pressure sensor 13 that is less than the second threshold value P2, air pressure in the dryer 6 may decrease, or pressure of discharged air may decrease, as a drain is discharged. Thus, it takes time to increase air pressure to that required by the supply destination. Then, when the drain discharge valve 11 is opened at the pressure value Po measured by the second pressure sensor 13 that is equal to or more than the second threshold value P2, increase in time required to increase the discharge pressure to the required pressure can be prevented.

In the present embodiment, the drain discharge valve 11 is closed at the predetermined time ΔT2 after the drain discharge valve 11 is opened. Thus, an excessive pressure decrease can be prevented by preventing an excessive leakage of the compressed air that may occur by continuing to open the drain discharge valve 11. When the acceleration of the motor 2 is changed to the first acceleration a1, a drain has already been discharged to the extent that carryover does not occur. Thus, carryover can be prevented even when the motor 2 is driven at the first acceleration a1, and rotation speed of the motor 2 can be accelerated in a shorter time than that when the motor 2 is driven at the second acceleration a2.

While the specific embodiments of the present invention are described above, the present invention is not limited to the above-described embodiments, and various modifications can be made within the scope of the present invention. For example, although in the above embodiments, the drain-discharge-valve control unit 7b closes the drain discharge valve 11 by selectively determining whether an earlier stage is after the acceleration is changed from the second acceleration a2 to the first acceleration a1, or when a predetermined time elapses after the drain discharge valve 11 is opened, the determination may not be selective. That is, the drain discharge valve 11 may be closed by determining only one of cases including after the acceleration is changed from the second acceleration a2 to the first acceleration a1, and when the predetermined time elapses after the drain discharge valve 11 is opened. For example, step S5-5 illustrated in FIG. 5 may be eliminated in the control device and control of the present invention.

The invention claimed is:

1. A compressor comprising:
   a compressor body driven by a motor to compress gas;
   an aftercooler for cooling the compressed gas supplied from the compressor body;
   a dryer for dehumidifying the compressed gas flowing out from the aftercooler;
   a drain discharge valve for discharging a drain from the dryer;
   a first pressure sensor for measuring gas pressure downstream of the aftercooler; and
   a control device including a rotation-speed adjusting unit that drives the motor at second acceleration smaller than first acceleration, the first acceleration being rated acceleration of the motor, when a pressure value measured by the first pressure sensor is less than a first threshold value predetermined at startup of the motor.

2. A compressor comprising:
   a compressor body driven by a motor to compress gas;
   a separator tank for separating a coolant from the compressed gas supplied from the compressor body and stores the coolant;
   a pressure-holding check valve for preventing the compressed gas from flowing back toward the separator tank to keep pressure in the separator tank equal to or more than a second threshold value predetermined;
   a dryer provided downstream of the pressure-holding check valve to dehumidify the compressed gas supplied;

a drain discharge valve for discharging a drain from the dryer;

a first pressure sensor for measuring gas pressure downstream of the pressure-holding check valve; and a control device including a rotation-speed adjusting unit that drives the motor at second acceleration smaller than first acceleration, the first acceleration being rated acceleration of the motor, when a pressure value measured by the first pressure sensor is less than a first threshold value predetermined at startup of the motor.

3. The compressor according to claim 2, further comprising:

a second pressure sensor for measuring the pressure in the separator tank, wherein the control device further includes a drain-discharge-valve control unit that opens the drain discharge valve when a pressure value measured by the second pressure sensor is equal to or more than the second threshold value at startup of the motor.

4. A compressor comprising:

a compressor body driven by a motor to compress gas;

an aftercooler for cooling the compressed gas supplied from the compressor body;

a dryer for dehumidifying the compressed gas flowing out from the aftercooler;

a drain discharge valve for discharging a drain from the dryer;

a first pressure sensor for measuring gas pressure downstream of the aftercooler;

a separator tank for separating a coolant from the compressed gas flowing from the compressor body to the aftercooler and stores the coolant;

a second pressure sensor for measuring pressure in the separator tank;

a pressure-holding check valve for preventing the compressed gas from flowing back toward the separator tank to keep the pressure in the separator tank equal to or more than a second threshold value predetermined; and a control device including:

a rotation-speed adjusting unit that drives the motor at second acceleration smaller than first acceleration, the first acceleration being rated acceleration of the motor, when a pressure value measured by the first pressure sensor is less than a first threshold value predetermined and a pressure value measured by the second pressure sensor is equal to or more than the second threshold value, at startup of the motor; and a drain-discharge-valve control unit that opens the drain discharge valve when the pressure value measured by the second pressure sensor is equal to or more than the second threshold value at the startup.

5. The compressor according to claim 3, wherein the rotation-speed adjusting unit changes acceleration of the motor from the second acceleration to the first acceleration when the pressure value measured by the first pressure sensor is equal to or more than the first threshold value, or when a predetermined time elapses after changing acceleration from the first acceleration to the second acceleration, and the drain-discharge-valve control unit closes the drain discharge valve after the acceleration is changed from the second acceleration to the first acceleration, or when a predetermined time elapses after the drain discharge valve is opened, whichever is earlier.

6. The compressor according to claim 5, wherein the rotation-speed adjusting unit accelerates the motor to rated rotation speed after change to the first acceleration.

7. A method of operating a compressor including:

a compressor body driven by a motor to compress gas;

an aftercooler for cooling the compressed gas supplied from the compressor body;

a dryer for dehumidifying the compressed gas flowing out from the aftercooler;

a drain discharge valve for discharging a drain from the dryer; and a first pressure sensor for measuring pressure of gas supplied to the dryer from the aftercooler, wherein the method further comprises driving the motor at second acceleration smaller than first acceleration, the first acceleration being rated acceleration of the motor, when a pressure value measured by the first pressure sensor is less than a first threshold value predetermined at startup of the compressor body.

8. A method of operating a compressor including:

a compressor body driven by a motor to compress gas;

a separator tank for separating a coolant from the compressed gas supplied from the compressor body and stores the coolant;

a pressure-holding check valve for preventing the compressed gas from flowing back toward the separator tank to keep pressure in the separator tank at a second threshold value or more;

a dryer provided downstream of the pressure-holding check valve to dehumidify the compressed gas supplied;

a drain discharge valve for discharging a drain from the dryer; a first pressure sensor for measuring gas pressure downstream of the pressure-holding check valve; and a second pressure sensor for measuring the pressure in the separator tank, wherein the method further comprises driving the motor at second acceleration smaller than first acceleration, the first acceleration being rated acceleration of the motor, when a pressure value measured by the first pressure sensor is less than a first threshold value predetermined at startup of the motor.

9. The method of operating a compressor, according to claim 8, wherein the drain discharge valve is opened when the pressure value measured by the second pressure sensor is equal to or more than the second threshold value.

10. The compressor according to claim 4, wherein the rotation-speed adjusting unit changes acceleration of the motor from the second acceleration to the first acceleration when the pressure value measured by the first pressure sensor is equal to or more than the first threshold value, or when a predetermined time elapses after changing acceleration from the first acceleration to the second acceleration, and the drain-discharge-valve control unit closes the drain discharge valve after the acceleration is changed from the second acceleration to the first acceleration, or when a predetermined time elapses after the drain discharge valve is opened, whichever is earlier.

* * * * *